United States Patent [19]
Anderson et al.

[11] 3,753,077
[45] Aug. 14, 1973

[54] DIRECT CURRENT CHOPPER CONTROL CIRCUIT

[75] Inventors: Albert W. Anderson; Charles E. Konrad, both of Roanoke, Va.

[73] Assignee: General Electric Company, Salem, Va.

[22] Filed: Aug. 31, 1971

[21] Appl. No.: 176,569

[52] U.S. Cl............. 321/45 C, 318/345, 318/506
[51] Int. Cl. ........................................... H02m 3/32
[58] Field of Search.................. 318/138, 345, 506, 318/507; 321/45 C

[56] References Cited
UNITED STATES PATENTS

| | | | |
|---|---|---|---|
| 3,594,629 | 7/1971 | Kawakami et al. | 321/45 C |
| 3,530,503 | 9/1970 | Appelo et al. | 321/45 C |
| 3,562,611 | 2/1971 | Gurwicz | 321/45 C |
| 3,614,586 | 10/1971 | King | 321/45 C |
| 3,619,753 | 11/1971 | Thompson | 321/45 C |
| 3,656,039 | 4/1972 | Konrad | 318/345 |

Primary Examiner—Gene Z. Rubinson
Attorney—Arnold E. Renner et al.

[57] ABSTRACT

A control circuit for controlling the effective power to a load from a power source of substantially constant direct current voltage including a first solid state switching device for placing the load and the power source in series. Circuitry including a commutating capacitor chargeable in a first direction, provides that capacitor discharge, initiated by the gating of a second solid state switching device, will terminate conduction of the first switching device. An inductance is provided in series with the load to develop a capacitor voltage in a second direction, related to load current, upon the termination of the conduction period. A series loop is provided including the capacitor, the inductor, and a third solid state switching device to reverse the polarity of the capacitor voltage to the first direction.

4 Claims, 3 Drawing Figures

DIRECT CURRENT CHOPPER CONTROL CIRCUIT

BACKGROUND OF THE INVENTION

The present invention relates generally to a control circuit for varying the effective power from a direct current source to an appropriate load and more particularly to a control circuit for varying the effective power to a series direct current motor through the control of the amount of time during which the motor and source are connected together. This may be achieved by varying the frequency of the pulses supplied to the load, by varying the width of the pulses or by some combination of both these methods.

It is known in the prior art that the amount of power which can be supplied to a load, such as direct current motor, from a substantially constant direct current voltage source may be varied by connecting and disconnecting the load to and from the source. The effective amount of power supplied to the load will vary in accordance with the percentage of time that the load and source are connected. It is also known in the prior art to use a solid state switching device, which may be switched at a selected frequency, to provide this varying amount of power. The solid state switching devices normally used in applications of this nature are those known as thyristors; the most common of which is the silicon controlled rectifier described in "SCR Manual 4th Edition," Copyright 1967 by General Electric Company. Thyristors are rendered conductive by the simultaneous application of a forward voltage bias and a gating signal. Once conduction is established the gating signal may be removed and conduction will continue until a zero current and a negative voltage bias is applied to the thyristor terminals.

One example of a motor control circuit embodying the type of control just described is found in U.S. Pat. No. 3,335,351, "DC Motor Control Circuit" by H. E. Morris and assigned to the assignee of the present invention. In this patent the motor is controlled through a main thyristor, specifically a silicon controlled rectifier (SCR) which is gated to the on or conductive state by the application to its gating terminal of a pulse from a variable frequency oscillator. This thyristor (SCR) is rendered nonconductive by way of energy stored in a suitable commutating capacitor which is allowed to discharge in the direction opposite to that to which the thyristor normally conducts. This control is highly typical of that presently in use for electrical vehicles. This type of control is, for the most part, quite satisfactory, particularly when compared to the previous methods utilizing variable resistors, in that the large bulk of the power consumed is within the motor itself and not dissipated in a large resistor bank. It is, however, to be realized that in controls of the type with which we are here concerned the conservation of even small amounts of energy is highly important. This is particularly true in the case of electrical vehicles where the sole source of power consists of storage batteries carried by the vehicle itself. In this particular application it is highly desirable that losses attributable to various circuit components be held to an absolute minimum.

One common problem in present day thyristor controls is that the main thyristor connecting the motor to the battery is in the circuit for charging the capacitor subsequently used to terminate conduction of the main thyristor. Even though thyristors are not normally considered as resistive devices, they do have some internal resistance and hence produce some loss in the system. Closely coupled to the loss problem is the problem surrounding the current carrying capacity of a given thyristor. Each thyristor type is limited in the amount of average current capability by internal heating effects. Thus, currents in addition to the motor current carried by the thyristor will reduce its ability to carry increased motor current.

An additional problem concerns the manner in which a thyristor begins conduction. In devices of this nature, the gating electrode is a point contact on the base material. When a gating pulse is supplied to the thyristor, conduction begins at that point contact and spreads out across the whole of the base material of the device. It is not until such time as the entire base material is conducting that the thyristor is capable of carrying its full rated current. The normal result of full rated current being applied to a thyristor prior to its reaching its fully conductive state is an increase in the operating temperature which can lead to the destruction of the device. Therefore, any action which can be taken to limit the rate of current increase through the thyristor will facilitate higher currents within the specified temperature limits of the device.

In many prior art control circuits the commutating capacitor is charged only during that period of time when the main circuitry is operative. In electric vehicles, for example, there is normally included a shorting switch which bypasses the control circuitry and places the motor directly across the battery in order to apply full power to the motor. It is conceivable, if one were to suddenly go from a full power situation involving the shorting switch to one of normal control, that the commutating capacitor would not be allowed sufficient time to charge and hence the commutation of the main power thyristor at the proper time would not be effected.

A further limitation of present day thyristor controls is the restriction imposed upon the minimum conduction interval of the main switching device by the time period required for the reversal of the energy stored by the commutating capacitor. In present day controls, the polarity of charge stored by the commutating capacitor is the opposite of that required for commutation of the main switching device before the initiation of the device conduction period. Hence, commutation of the main switching device must be delayed until the capacitor charge has been reversed, imposing a limit upon the minimum conduction period of the main switching device. Since the power delivered to the load is a function of the percentage of time in which the main switching device is conductive, the imposition of a minimum conduction period also results in a necessarily lower operating frequency with an increased ripple component in the load current. The ripple components in the current supplied to a motor load result in increased motor heating with no additional torque.

SUMMARY OF THE INVENTION

The foregoing deficiencies of the prior art are alleviated by the control system of the present invention which provides that the storage means or commutating capacitor utilized to render the main switching device nonconductive is provided in a circuit functionally independent of the main switching device. Thus, it is possible to provide means for the reversal of the commutating capacitor charge before the initiation of conduction by the main switching device which imposes no restrictions upon the minimum conduction interval and overcomes the current rise rate problem encountered in prior art controls which incorporate the main switching device in the charge reversal path. This configuration further provides an inductance which when properly sized with respect to the other circuit elements, serves to control the commutating capacitor voltage in response to the load current, to limit the rate of current increase in the main switching device, and to facilitate the resonant reversal of the commutating energy.

It is, therefore, an object of the present invention to provide an improved control circuit for varying the power supplied from a direct current source to a load.

A further object of the invention is to provide a control circuit for the regulation of the power supplied to a series direct current motor where no limit is imposed upon the minimum conduction interval of the main switching device.

A still further object of the invention is to provide an inductance which, when properly proportioned with respect to the other circuit elements, serves the multiple functions of providing a commutation period independent of the load current, of limiting the rate of current increases through the main switching device, and of forming, in conjunction with the commutating means, a resonant circuit for the reversal of the charge stored by the commutating means.

DESCRIPTION OF THE DRAWINGS

The foregoing and other objects of the invention will become apparent as the following description proceeds and features of novelty which characterize the invention will be pointed out in particularity in the claims affixed to and forming a part of this specification. For a better understanding of this invention, reference is made to the accompanying drawings in which:

DETAILED DESCRIPTION

Figure 1:
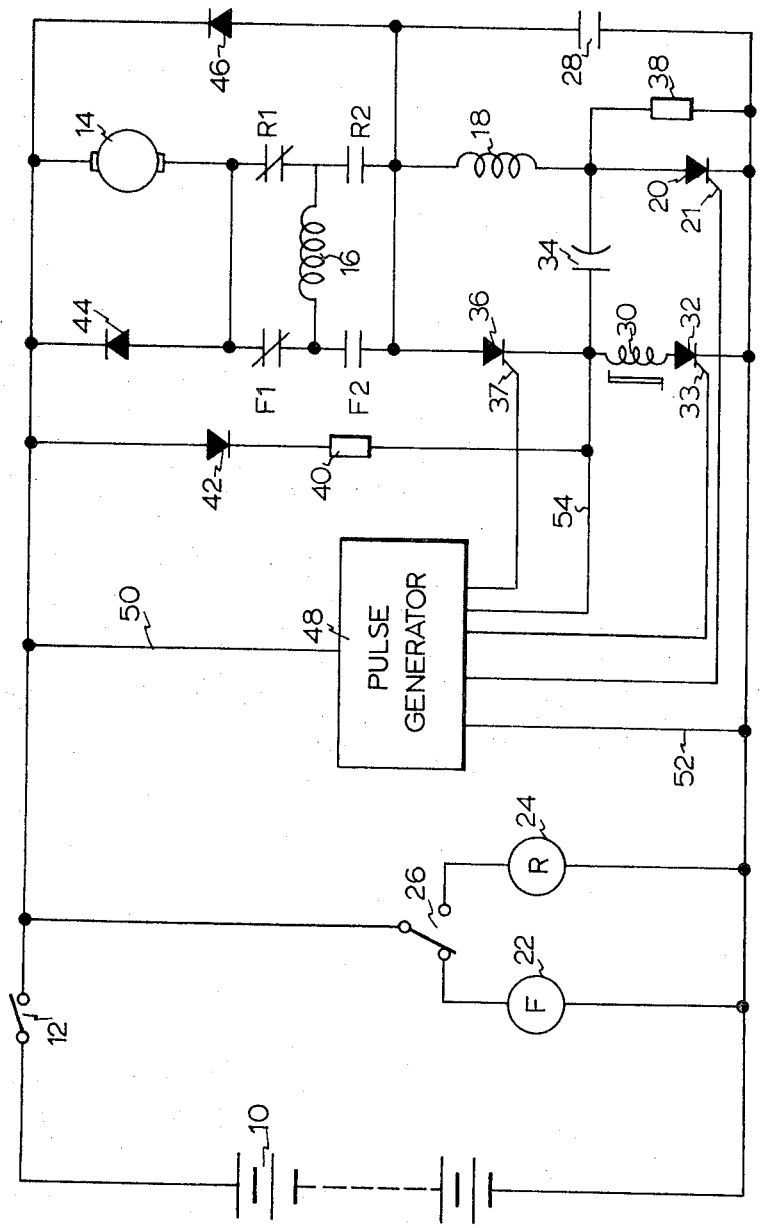
FIG. 1 is a schematic drawing illustrating the present invention in its preferred embodiment.

Referring now to FIG. 1, there is shown a suitable source of direct current power 10, illustrated as a battery, disposed with its positive terminal at the top and its negative terminal at the bottom. A master switch 12 serves to connect and disconnect the source to and from the rest of the circuit. In a series loop with the battery is a series direct current motor having an armature 14 and a field winding 16. The direction of the current through the field winding 16 is governed by the relative condition of four contacts F1, F2, and R1, R2 as will be hereinafter described. Completing the series loop is an inductor 18 and a solid state switching device 20 connected with its anode to the inductor 18 and its cathode to the negative terminal of the battery 10. The switching device 20 may be any suitable type, but preferably, as illustrated, is that of the type generally belonging to the class known as thyristors (the most common type of thyristor being the silicon controlled rectifier). As such, thyristor 20 includes a gating terminal 21 to which a gating pulse may be applied to initiate conduction.

The direction of current to the motor field winding 16, and hence the direction of torque resulting from applied power, is determined by two pairs of switch contacts, F1, F2, and R1, R2. Upon opening of the normally closed F1 contact and closure of the normally open F2 contact, current from the source 10 will flow in the winding 16 in a first direction (right to left as viewed in FIG. 1) while actuation of contacts R1 and R2 will result in the flow of current from the source 10 in the opposite direction, that is from left to right. Operation of the contact pairs, F1, F2, and R1, R2, is under respective control of an F coil 22 and an R coil 24, each of which may be selectively connected across the battery 10 by means of a selection switch 26. That is, when the switch is closed to the left, as shown in FIG. 1, the F coil is energized, causing contacts F1 and F2 to be actuated. Conversely, when the switch 26 is connected to the right, R coil 24 is energized, actuating contacts R1 and R2. The F and R designations indicate respectively the forward and reverse directions of torque when power is applied to the motor. The cathodes of diodes 44 and 46 are connected to one side of the armature 14. The anode of diode 44 is connected to the other terminal of the armature 14 while the anode of diode 46 is connected to the free end of the field 16. The diodes 44 and 46 provide the functions of smoothing motor current and of limiting regeneration during braking in a manner well known in the art.

Thyristor 20 is the main power thyristor and during operation of the motor the effective power delivered thereto, in either the forward or reverse direction, is governed by the percentage of time in which the thyristor 20 is in its conductive state. A short-circuiting contact 28 connected across the series combination of inductor 18 and thyristor 20 serves to place the motor directly across the battery 10 providing maximum power to the motor in a manner well known in the art.

In parallel with the main power thyristor 20 is a series commutating circuit including a saturable inductor 30, a second solid state switching device 32, which device may also be a thyristor having a gating connection 33, and a suitable storage means for electrical energy, for example, a commutating capacitor 34. The saturable inductor 30, connected to the anode of thyristor 32 in the present embodiment, provides a choke effect to limit the initial current surge when this portion of the circuit is rendered conductive. The cathode of thyristor 32 is connected to the negative terminal of the battery 10. The left plate of capacitor 34 is connected to the inductor 30 and the right plate is connected to the anode of thyristor 20. A resistor 40 and a diode 42 join the positive bus of the system to the junction of the saturable inductor 30 and capacitor 34. This circuit, comprising resistor 40 and diode 42, serves as a link of continuous communication between the positive terminal of the battery and the left plate of the capacitor 34 whereby the capacitor 34 retains a minimum charge under specified operating conditions as will be hereinafter described. A charge reversing circuit comprising an inductor 18 in series with a third solid state switching device or thyristor 36 is connected in parallel with the capacitor 34. Thyristor 36 includes a gating connection 37. A pulse generator 48, connected across the battery 10 by leads 50 and 52, serves to provide appropriate gating signals to the thyristors 20, 32 and 36 as will be explained in greater detail with respect to FIG. 3.

Figure 2:
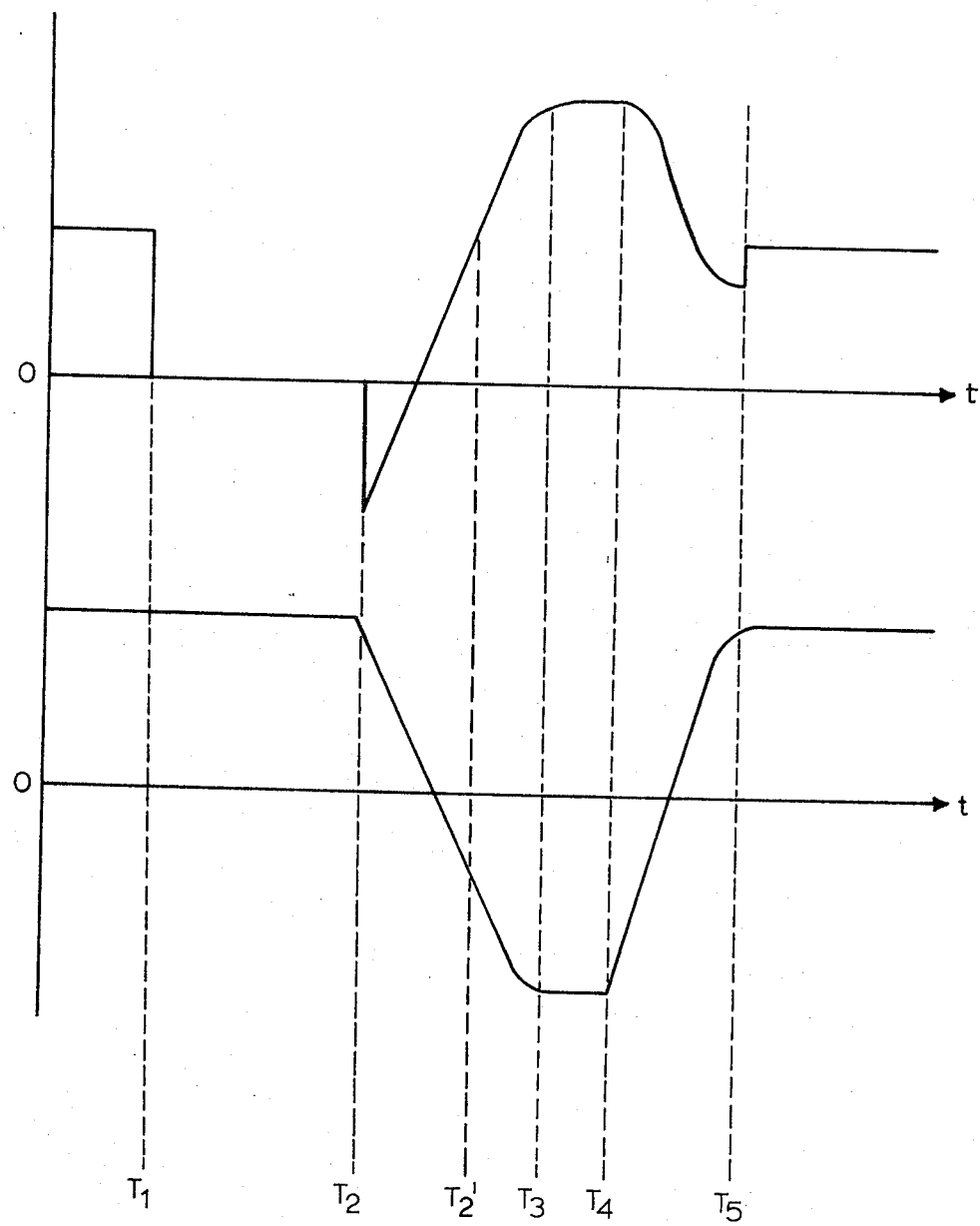
FIG. 2 depicts typical relevant voltage waveforms of one operating cycle of the preferred embodiment.

Referring now to FIG. 2, the top graph depicts a typical waveshape of the voltage across the main thyristor 20 during one operating cycle of the present embodiment. The lower graph illustrates the waveshape of the voltage across the commutating capacitor 34 scaled to the same time reference. The vertical axis of each graph represents a voltage scale while the horizontal axis is time scaled, where the time reference of discrete events in the operating cycle are designated by the time points $T_1$ through $T_8$.

Figure 3:
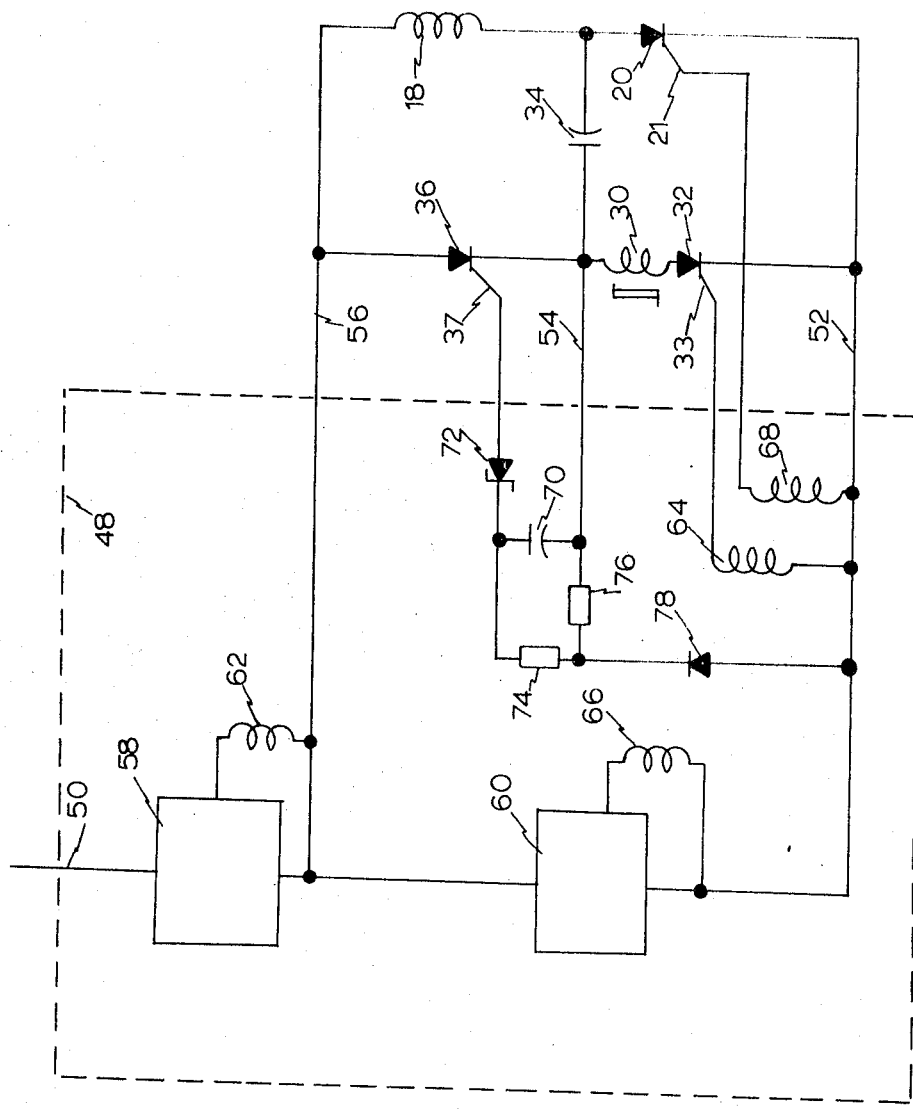
FIG. 3 is a schematic drawing of the pulse generator which supplies gating signals to the thyristors.

FIG. 3 illustrates in greater detail the essential elements of the pulse generator 48 of FIG. 1. In FIG. 3, the gating connections 21, 33, and 37 of thyristors 20, 32, and 36, respectively, are connected to the pulse generator contained within the rectangle 48. The pulse generator 48 is supplied with power via leads 52 and 50 which are connected respectively to the negative terminal of the battery 10, and to the positive terminal of the battery 10 through the switch 12. Additional inputs to the pulse generator 48 are supplied by lead 54 which is connected through inductor 30 to the anode of thyristor 32, and by lead 56 which is connected through inductor 18 to the anode of thyristor 20.

Two unijunction relaxation oscillators, shown as blocks 58 and 60, provide impulses for the gating of thyristors 32 and 20 respectively. The unijunction oscillators 58 and 60 are of the form well known in the art, such as that described in "SCR Manual 4th Edition," page 76, Copyright 1967 by General Electric Company. When power is applied to an oscillator, an adjustable predetermined time delay must elapse before an output impulse occurs. When thyristor 20 is switched into a conductive state, lead 56 assumes the negative potential of the battery 10, and since the potential of lead 50 is the same as the positive potential of the battery 10, the timing interval of the unijunction oscillator 58 is initiated. After a predetermined time interval, the oscillator 58 supplies a pulse to a primary winding 62, which is magnetically coupled to a secondary winding 64, providing a gating signal to thyristor 32. The conduction interval of thyristor 20 is terminated by the gating of thyristor 32 through a sequence of events which will be described later. Hence, the timing interval of the oscillator 58 determines the conduction interval of thyristor 20.

When thyristor 20 becomes nonconductive, lead 56 assumes positive battery potential and power is removed from oscillator 58, and applied to oscillator 60, which initiates the timing interval of oscillator 60. After the predetermined time delay of oscillator 60, a pulse is applied to a primary winding 66 which is magnetically coupled to a secondary winding 68 connected to the gate lead 21 of thyristor 20, and to the cathode of thyristor 20 via lead 52. This pulse initiates conduction of thyristor 20 which then reduces the potential of lead 56 to the negative battery potential, removing power from oscillator 60. Hence, the time delay of oscillator 60 determines the nonconductive interval of thyristor 20.

A voltage across thyristor 32, positive to the cathode, produces a forward current through diode 78 which has the anode connected to the cathode of thyristor 32 via lead 52, and the cathode connected to the anode of thyristor 32 through a series connected resistor 76 and the inductor 30. This current develops a voltage across the resistor 76 which is applied to a parallel series-circuit comprising resistor 74 and capacitor 70 which begins to charge capacitor 70 positive to the top plate. When the voltage across capacitor 70 reaches the Zener level of Zener diode 72, which has its cathode connected to the junction of resistor 74 and capacitor 70, and its anode connected to the gate 37 of thyristor 36, power is applied to the gate of thyristor 36 which initiates conduction. The conduction of thyristor 36 removes the reverse potential across thyristor 32 by a sequence of events which will be later described, and the charge on capacitor 70 is dissipated through the series loop comprising resistors 74 and 76, and capacitor 70.

Referring collectively now to FIGS. 1, 2, and 3, one operational cycle of the preferred embodiment will be described in detail.

Assume first, for purposes of this discussion, that this is an initial operation, that there is no residual charge on the capacitor 34 and that all thyristors are in the nonconductive state. With the closing of the master switch 12, power is applied from the battery 10 via leads 50 and 52 to the pulse generator 48 and to the capacitor 34 by the series circuit comprising diode 42, resistor 40, and resistor 38 allowing capacitor 34 to charge to battery voltage with its left plate positive, shown at time point $T_0$ of FIG. 2. Selector switch 26 is now actuated to either the F or R position to operate the appropriate contacts with respect to the field winding 16. For purposes of this illustration, it is assumed that the switch 26 is positioned to the left, thus energizing the F coil 22, opening contact F1 and closing contact F2. Inasmuch as all of the thyristors are still in the nonconductive state, however, no current will exist through the motor at this time. A pulse is now supplied by the pulse generator 48 via gating connection 21 to gate thyristor 20 to the conductive state. At this instant in time, $T_1$ of FIG. 2, a voltage very nearly equal to the battery voltage is applied across the motor armature 14 and the field winding 16 resulting in a motor current whose rate of increase is determined almost entirely by the motor inductance and resistance. (In the event the motor is turning because of prior operation the generated voltage of the motor will also affect the rate of motor current increase.)

After a time delay corresponding to the prescribed conduction interval of thyristor 20, time point $T_3$, a current pulse, developed by the pulse generator 48, is applied to the gating connection 33 of thyristor 32 switching the thyristor into a conductive state. The voltage resulting from the charge stored by the capacitor 34, positive to the left plate, is then applied to the series loop comprising the saturable inductor 30, the commutating thyristor 32, and the main thyristor 20; however, the current of this series loop is initially limited to a low level by the inductor 30. During the period required for the magnetic flux of inductor 30 to increase to the saturation level (typically 5 microseconds), the conductive area of thyristor 32 increases to encompass the complete cross-sectional area of the device. When the magnetic flux of inductor 30 reaches the saturation level, the voltage on the capacitor 34 is impressed across the main power thyristor 20 in a direction opposite to its conduction forcing the anode of that thyristor negative with respect to its cathode thus rendering it nonconductive.

After thyristor 20 ceases to conduct, the capacitor voltage is applied to the series circuit comprising inductor 30, thyristor 32, the direct current source 10, the motor armature 14, the motor field winding 16, and the inductor 18; however, the relatively large inductance of the motor limits the increase in load current to a small value. When at time point $T_2$, the voltage of commutating capacitor 34 attains a value equal to that of the direct current source 10, positive to the right plate, the current through the series loop is a maximum. The motor is then decoupled from the series circuit since the motor current is maintained at substantially the same level through the inductive effect which forces the motor current through the flyback diode 46. The energy stored in the inductor 18 must ultimately be converted into energy stored by the commutating capacitor 34. The peak overshoot voltage $V_P$ attained by capacitor 34 (positive to the right plate) can be derived directly from an energy consideration of the circuit in this state, which leads to the expression:

$$V_P^2 = (L/C) I^2 + V_B^2$$

where $V_P$ is the peak overshoot voltage, $L$ is the circuit inductance substantially equal to the inductance of inductor 18, $C$ is the capacity of the energy storage means 34, $I$ is the load current, and $V_B$ is the voltage of the direct current voltage source 10. The use of this expression in the selection of inductor 18 will be described later. When the capacitor 34 attains the peak overshoot voltage $V_P$ at time point $T_3$, the difference between the peak overshoot voltage and the source potential $V_B$ is impressed as a reverse potential across the series combination of the commutating thyristor 32 and the saturable inductor 30 via the series circuit comprising inductor 18, flyback diode 46, and the direct current source 10. The initial current is limited to a low level for the period required to saturate the inductor 30 in the reverse direction (typically 7 microseconds) and the potential difference of $V_P - V_B$ appears as reverse bias on the thyristor 32 which forces it into a nonconductive state. The peak overshoot voltage $V_P$ is then trapped on the commutating capacitor 34 (positive to the right plate).

The reverse voltage across thyristor 32 is sensed by the pulse generator 48 via leads 52 and 53, and after a suitable time delay necessary for thyristor 32 to achieve complete forward voltage blocking capability, a current pulse is supplied by the pulse generator 48 to the gating terminal 37 of thyristor 36 at time point $T_4$, which is then switched to a conductive state. A series loop comprising capacitor 34 (charged to voltage $V_P$ positive to the right plate), inductor 18, and thyristor 36 provides for a resonant reversal of the capacitor charge. When the capacitor attains a voltage $V_P$ positive to the left plate, the capacitor voltage appears across thyristor 36 in a direction opposite to its conductive path which forces this thyristor into a nonconductive state at time point $T_5$.

Each of the thyristors is then in a non-conductive state and the commutating capacitor is precharged positive to the left plate. The system has now completed one complete power cycle and the pulse generator 48 will next provide a pulse to thyristor 20 to initiate a subsequent cycle. As indicated, the timing of the next cycle is dependent upon the desired amount of power to be supplied to the load. In the situation of a motor load; for example, as an electric vehicle, the pulse frequency and/or width would be determined through a speed controller mechanism.

During the interpulse period, when battery power is not supplied to the motor, the current of the motor is maintained by inductive effects through the rectifiers 44 and 46 connected, respectively, as follows. The cathodes of the diodes 44 and 46 are connected to one terminal of the armature 14. The anode of diode 44 is connected to the other terminal of the armature 14 while the anode of the diode 46 is connected to the free end of the field 16. Thus when the motor is de-energized with respect to the source 10, diode 46 carries the field current while the diode 44 carries the field current minus the armature current. During the interpulse periods when no power is applied to the motor, the motor current will begin to decay on the natural time constant of the field and the armature. During normal operation, however, the frequency of power application is great enough compared to the time constant of the motor that the amount of motor current decay is small, thus minimizing ripple components.

The system is now in condition for the second pulse operation which will be that previously described with a few minor differences. Specifically, prior to the next gating of the main power thyristor 20, the commutating capacitor will be charged above battery potential and the commutating circuit is properly oriented to effect the commutation of thyristor 20. In this situation, when the main power thyristor 20 is again gated, its anode current can rise almost instantaneously to the level of the load current, but is limited by inductor 18 to a rate of increase which is within the tolerance of thyristor 20. The motor current will then build up to a higher value than previously achieved, resulting in a somewhat higher commutating voltage being developed on the commutating capacitor 34. Upon subsequent cycles these changes will continue until a steady-state condition is reached and which is determined by several variables including the vehicle speed, the pulse width and the pulse rate as applied to the thyristor 20.

Brief mention was previously made of the shorting contact 28 which is closed when it is desired to apply battery voltage to the load (motor). In the case of an electric vehicle this contactor is normally closed by means of the acceleration control when it is desired to maintain the motor operation at full speed or, for example, when the vehicle is stuck in a "chuckhole" and maximum torque is required. Contactor 28 is not interconnected, with respect to time, with any of the other components of the circuit. A commutation failure can occur if there exists no way of assuring that at the time contactor 28 is opened and control is returned to that part of the system involving the pulse generator that the commutating capacitor will be charged to the necessary degree required for turning off or commutating the thyristor 20 at the appropriate time. This problem is alleviated in the circuit of the present invention by the inclusion of the resistor 40 and the diode 42 which maintain the battery in communication with the capacitor 34 at all times of system operation. Hence, the minimum charge retained by capacitor 34 is that of battery voltage on its left plate thus assuring commutation of thyristor 20 during the first cycle after the opening of contactor 28.

Brief mention was also previously made to the use of the energy balance equation in the selection of inductor 18. It is well known in prior art that the commutation of a switching device such as a thyristor requires the application of a reverse bias for a specified time interval ($\Delta t$) before the device is capable of withstanding the reapplication of forward blocking voltage. This time interval can be related to the initial voltage $V_P$ stored by a commutating capacitor C and to the load current I by the relation:

$$\Delta t = CV_P/I$$

It was previously shown that the voltage $V_P$ stored by the commutating capacitor $C$ is related to the inductance $L$, the load current $I$, and source voltage $V_B$ by the relation:

$$V_P{}^2 \ 32 \ (L/C \ I^2 + V_B{}^2$$

When the overshoot voltage $V_P$ is large compared to the supply voltage, that is two or more times as large, these relations can be combined to obtain:

$$t = \sqrt{LC}$$

The commutating time can, therefore, be specified by the size of the commutating capacitor and the magnitude of the inductance which includes both stray inductance, and the inductance of inductor 18. In this embodiment the inductance of inductor 18 is substantially greater than the stray inductance and is chosen in conjunction with the magnitude of capacitor C to provide the necessary commutating time in accordance with the relationship previously specified in the expression for the commutating time $\Delta t$.

While it is apparent that the value of the several components utilized in the system described will vary greatly according to the voltage of the source and the particular motor utilized, the following table sets forth typical values for components in the power circuit:

| | |
|---|---|
| Maximum Load Current | 400 Amperes |
| Source Voltage | 36 Volts |
| Commutating Capacitance | 100 Microfarads |
| Total Inductance (unbypassed) | 25 Microhenrys |
| Stray Inductance | 5 Microhenrys |
| Inductance of Inductor 18 | 20 Microhenrys |
| Peak Overshoot Voltage (at maximum current) | 200 Volts |

While the foregoing description has been directed primarily to the control of a direct current motor, it will be immediately obvious to those skilled in the art that the present invention is not so limited and the appended claims are, therefore, intended to cover the full spirit and scope of the present invention.

What is claimed is:

1. A system for controlling the amount of power delivered to a load from a direct current power source comprising:
    a first switching device having a first and a second end;
    an inductor coupled to one end of said first switching device;
    means for coupling said inductor and said first switching device in series circuit relationship between the load and the DC power source;
    a capacitor;
    a second switching device connected to said capacitor;
    means for coupling said capacitor and said second switching device in parallel circuit relationship with said inductor, and in series circuit relationship with said first switching device;
    a third switching device;
    means for coupling said third switching device between the intersection of said second solid state switching device and said capacitor, and said second end of said first solid state switching device;
    control means to selectively render said first, second and third switching devices conductive to allow charge to flow to said capacitor in a first direction through said inductor, to allow the charge thus accrued upon said capacitor to reverse by flowing in a second direction through said inductor, and to couple said reversely charged capacitor across said first switching device to cause said first switching device to assume a nonconductive state.

2. The invention defined in claim 1, wherein said first, second, and third switching devices are gated solid state thyristors.

3. A circuit in accordance with the provisions of claim 2 in which the third switching device is rendered conductive by a gating signal initiated by sensing a reverse voltage across said second switching device.

4. The invention defined in claim 3, further including a second inductor coupled in series with said third switching device for limiting the rate of current increase through said third switching device.

* * * * *